US012669159B2

(12) United States Patent
Madzgalla

(10) Patent No.: US 12,669,159 B2
(45) Date of Patent: Jun. 30, 2026

(54) FLOATING CALIPER BRAKE WITH AN ADJUSTMENT DEVICE

(71) Applicant: ZF Active Safety GmbH, Koblenz (DE)

(72) Inventor: Lukas Madzgalla, Lahnstein (DE)

(73) Assignee: ZF Active Safety GmbH, Koblenz (DE)

( * ) Notice: Subject to any disclaimer, the term of this patent is extended or adjusted under 35 U.S.C. 154(b) by 414 days.

(21) Appl. No.: 18/507,326

(22) Filed: Nov. 13, 2023

(65) Prior Publication Data

US 2024/0159285 A1 May 16, 2024

(30) Foreign Application Priority Data

Nov. 10, 2022 (DE) .......................... 102022211927.4

(51) Int. Cl.
| | |
|---|---|
| *F16D 65/54* | (2006.01) |
| *B60T 1/06* | (2006.01) |
| *F16D 55/226* | (2006.01) |
| *F16D 65/00* | (2006.01) |
| *F16D 65/66* | (2006.01) |
| *F16D 55/00* | (2006.01) |
| *F16D 127/02* | (2012.01) |

(52) U.S. Cl.
CPC .............. *F16D 65/66* (2013.01); *B60T 1/065* (2013.01); *F16D 55/226* (2013.01); *F16D 65/0056* (2013.01); *F16D 2055/0008* (2013.01); *F16D 2127/02* (2013.01)

(58) Field of Classification Search
CPC .. F16D 55/226; F16D 55/227; F16D 65/0056; F16D 65/52; F16D 65/54; F16D 65/66
See application file for complete search history.

(56) References Cited

U.S. PATENT DOCUMENTS

| | | | | |
|---|---|---|---|---|
| 3,618,714 A | * | 11/1971 | Croswell ................. | F16D 65/54 192/111.1 |
| 4,148,380 A | * | 4/1979 | Haraikawa ............ | F16D 65/563 192/111.16 |
| 4,345,674 A | * | 8/1982 | Vacval .................... | F16D 65/54 188/196 P |
| 4,382,491 A | * | 5/1983 | Chun ................ | F16D 55/22655 188/196 P |
| 4,706,784 A | * | 11/1987 | Shellhause ............ | F16D 65/563 188/196 BA |

(Continued)

FOREIGN PATENT DOCUMENTS

| | | | | |
|---|---|---|---|---|
| DE | 4119928 A1 | 12/1992 | | |
| DE | 9390273 U1 | 10/1994 | | |
| WO | WO-9412805 A1 | * 6/1994 | .......... | F16D 65/566 |

*Primary Examiner* — Thomas W Irvin
(74) *Attorney, Agent, or Firm* — Kristin L. Murphy

(57) ABSTRACT

Depicted and described is a floating caliper brake comprising an adjustment device, wherein when a second distance between a first end section and a second end section is equal to, or greater than, a predefined distance, an actuation section of an adjustment element engages with a gear section in such a way that an increase in the second distance of the actuation section of the adjustment element causes the gear section to rotate about a central axis relative to a second transmission section, in such a manner that the second transmission section moves away from the gear section along the axial direction.

20 Claims, 10 Drawing Sheets

(56)     References Cited

U.S. PATENT DOCUMENTS

| | | | | |
|---|---|---|---|---|
| 5,186,284 | A * | 2/1993 | Lamela | F16D 55/36 |
| | | | | 188/170 |
| 5,246,090 | A * | 9/1993 | Quere | F16D 65/566 |
| | | | | 192/111.16 |
| 6,397,983 | B1 * | 6/2002 | Roszman | F16D 55/227 |
| | | | | 188/73.44 |
| 6,397,984 | B1 * | 6/2002 | De Andreis | F16D 65/563 |
| | | | | 188/79.53 |
| 6,691,838 | B2 * | 2/2004 | Wang | F16D 65/566 |
| | | | | 188/79.51 |
| 6,766,886 | B2 * | 7/2004 | Bendtsen | F16D 65/18 |
| | | | | 188/196 P |
| 6,918,468 | B2 * | 7/2005 | Girini | F16D 65/566 |
| | | | | 188/196 BA |
| 2003/0226729 | A1 | 12/2003 | Ohnishi et al. | |

* cited by examiner

FLOATING CALIPER BRAKE WITH AN ADJUSTMENT DEVICE

CROSS-REFERENCE TO RELATED APPLICATION

This application claims priority to German Priority Application No. 102022211927.4, filed Nov. 10, 2022, the disclosure of which is incorporated herein by reference in its entirety.

TECHNICAL FIELD

The present disclosure relates to a floating caliper brake.

BACKGROUND

Floating caliper brakes are known from the prior art. These floating caliper brakes usually comprise a brake carrier, which has a fastening arrangement for fastening the brake carrier to a component of a vehicle, a brake caliper, which has a fastening arrangement for fastening an adjustment device to the brake caliper, and a guide mechanism, which is designed to guide the brake caliper relative to the brake carrier along in an axial direction.

Brake pads, which can be brought into contact with a brake disc by an adjustment device, are usually connected to the brake caliper. When the brake pads are brought into contact with the brake disc, this can decelerate a rotational movement of the brake disc about a rotational axis running parallel to an axial direction. Bringing the brake pads into contact with the brake disc can also be referred to as the braking operation. During a braking operation, braking forces act between the brake disc and the brake pads. For example, the braking forces that act perpendicularly to the axial direction, or at least a significant section of these braking forces, are usually transmitted straight to the brake carrier via carrier plates to which the brake pads are fastened, via contact surfaces at which the carrier plates lie against the brake carrier. In turn, forces in the brake caliper mainly act along an axial direction. The weight of the brake caliper, the weight of an adjustment device, vibrations caused by the braking operation, for example, deformation forces, or even a small proportion of the forces caused by the braking operation acting perpendicularly to the axial direction, can be transmitted to the component of the vehicle via the brake caliper and the brake carrier.

In general, it is desirable in the case of floating caliper brakes, particularly when there are signs of wear on the brake pads or the brake disc, to guarantee a delay-free braking operation and to ensure that when there is no braking operation, the brake pads are spaced apart from the corresponding surfaces of the brake disc at a sufficient distance.

SUMMARY

Therefore, what is needed is to provide a floating caliper brake in which, for example when there are signs of wear on the brake pads or the brake disc, a delay-free braking operation is guaranteed, and when there is no braking operation, sufficient distance is guaranteed between the brake pads and the corresponding surfaces of the brake disc.

According to a first aspect of the disclosure, a floating caliper brake is disclosed. The floating caliper brake comprises a brake carrier, a brake caliper, and a guide mechanism. The brake carrier has a fastening arrangement for fastening the brake carrier to a component of a vehicle. The brake caliper has a fastening arrangement for fastening an adjustment device to the brake caliper.

The guide mechanism is designed to guide the brake caliper relative to the brake carrier along an axial direction. The guide mechanism comprises a guide element that extends from a fastening region, by which the guide element is fastened to a section of the brake caliper, towards a free end, and a bore section extending along the axial direction in a section of the brake carrier. A section of the guide element is arranged in the bore section.

Additionally, the floating caliper brake comprises an adjustment device. The adjustment device comprises an adjustment element, a first transmission section, a second transmission section and a gear section. The first transmission section has a first fastening region by which the first transmission section is connected to a brake carrier section. The first transmission section has a second fastening region, by which the first transmission section is connected to a first end section of the adjustment element. The second transmission section has a third fastening region by which the second transmission section is connected to the free end of the guide element. The gear section is connected to the second transmission section via an internal thread and an external thread, so that rotating the gear section about a central axis extending along the axial direction relative to the second transmission section results in an adjustment of the second transmission section relative to the gear section along the axial direction. The gear section is connected to a connecting section that is connected to a second end section of the adjustment element. The first transmission section and the second transmission section can be arranged relative to one another along the axial direction, so that the adjustment element is in a first position, in which the first end section and the second end section are spaced apart from one another along the axial direction at a first distance. The first transmission section and the second transmission section can be arranged relative to one another along the axial direction, so that the adjustment element is in a second position, in which the first end section and the second end section are spaced apart from one another along the axial direction at a second distance which is smaller than the first distance. When the second distance between the first end section and the second end section is equal to, or greater than, a predefined distance, an actuation section of the adjustment element, in particular a free end of the adjustment element, engages with the gear section in such a way that an increase in the second distance of the actuation section of the adjustment element causes the gear section to rotate about the central axis relative to the second transmission section, in such a manner that the second transmission section moves away from the gear section along the axial direction.

As described above, the brake carrier comprises the fastening arrangement for fastening the brake carrier to the component of the vehicle. The component is, for example, a wheel carrier of the vehicle. The fastening arrangement of the brake carrier guarantees that forces generated by a braking operation can be transmitted from the brake carrier to the component of the vehicle.

As also described above, the brake caliper has the fastening arrangement for fastening the adjustment device to the brake caliper. In one exemplary arrangement, the adjustment device comprises an electromechanical drive unit, which has a first section connected to the fastening arrangement of the brake caliper, and in one exemplary arrangement, a second section movably mounted relative to the first section.

Alternatively, the adjustment device comprises a hydraulic drive unit, which may have a first section connected to the fastening arrangement of the brake caliper, and a second section movably mounted relative to the first section. Furthermore, in one exemplary arrangement, the drive unit is designed to drive a relative movement between the first section and the second section. In one exemplary arrangement, the brake caliper is connected to a first brake pad, and the second section of the drive unit is connected to a second brake pad. In this case, a first carrier plate, to which the first brake pad is attached, can be attached to the brake caliper, and a second carrier plate, to which the second brake pad is attached, can be attached to the second section of the drive unit. In the mounted state, the first brake pad is arranged on a first side of a brake disc, and the second brake pad is arranged on a second side of the brake disc, in such a manner that the first brake pad, the brake disc and the second brake pad are arranged one after the other along the axial direction. In the mounted state of the brake disc, by moving the first section and the second section relative to one another along the axial direction, the first brake pad can preferably be moved in the direction of a first side of the brake disc and brought into contact with the brake disc, and the second brake pad can be moved in the direction of a second side of the brake disc and brought into contact with the brake disc. The adjustment device is configured to move the first brake pad in the direction of and against a surface on the first side of the brake disc and to move the second brake pad in the direction of and against a surface on the second side of the brake disc.

The guide mechanism is designed to guide the brake caliper relative to the brake carrier along an axial direction. In connection with the present disclosure, the axial direction relates to a mounted state in which the brake carrier, the brake caliper, the guide mechanism, and a brake disc are mounted. In this mounted state, the axial direction extends parallel to the rotational axis of the brake disc.

The guide mechanism comprises the guide element, which extends from the fastening region, by which the guide element is fastened to the section of the brake caliper, towards the tree end of the guide element, and the bore section extending along the axial direction in the section of the brake carder. The fastening region is connected to the section of the brake caliper in such a way as to prevent a movement of the fastening region and the section of the brake caliper along the axial direction in respect of one another. This guarantees that translation of the guide element along the axial direction relative to the brake caliper is prevented. The fact that the bore section extends in the section of the brake carrier along the axial direction means that the bore section can be used to guide the brake caliper relative to the brake carrier along the axial direction. For fastening to the brake caliper, the fastening region of the guide element has an internal thread extending along a central axis of the guide element, with which an external thread of a screw engages. The combination of internal thread and screw with external thread provides a simple and reliable detachable connection between the fastening region of the guide element and the brake caliper.

The section of the guide element is arranged in the bore section. The section of the guide element that is arranged in the bore section is arranged between the fastening region and the free end of the guide element. The section of the guide element is arranged in the bore section in such a way that forces perpendicular to the axial direction can be transferred between the guide element and the section of the brake carrier, while a relative movement between the guide element and the section of the brake carrier is simultaneously guaranteed along the axial direction. Forces resulting from the weight of the brake caliper, the weight of an adjustment device, vibrations, deformation forces or even from a braking operation can be transmitted from the brake caliper to the guide element via the fastening region of the guide element, and from said guide element, via contact of the section of the guide element with an inner surface of the bore section, to the brake carrier, particularly perpendicularly to the axial direction, and from there to the component of the vehicle.

Moreover, the floating caliper brake includes the adjustment device. As described in greater detail below, the adjustment device is designed to set an optimal clearance in the floating caliper brake.

The adjustment device comprises the adjustment element. The adjustment element comprises the first end section and the second end section, by which the readjustment element can be connected to other components of the floating caliper brake or by which the readjustment element can come into contact with other components of the floating caliper brake.

The adjustment device comprises the first transmission section. The first transmission section comprises the first fastening region, by which the first transmission section is connected to the brake carrier section, so that a force transmission between the first transmission section and the brake carrier section is guaranteed. The first fastening region has an external thread and the brake carrier section, by which the first transmission section is connected, preferably has an internal thread, wherein the first fastening region is connected to the brake carrier section via the external thread and the internal thread. The combination of internal thread and external thread provides a simple and reliable detachable connection between the first transmission section and the brake carrier.

The first transmission section comprises the second fastening region, by which the first transmission section is connected to the first end section of the adjustment element, so that a force transmission between the first transmission section and the adjustment element is accomplished. The second fastening region preferably has one or multiple contact surfaces oriented in the circumferential direction about the central axis, wherein a contact surface of the first end section of the adjustment element in each case abuts against each of the one or multiple contact surfaces of the second fastening region, so that the adjustment element and the first transmission section are rotationally secured relative to one another in respect of rotation about the central axis. Moreover, the second fastening region has a contact surface running about the central axis and oriented in the axial direction, against which the first end section abuts against the axial direction, so that forces can be transmitted, particularly along the axial direction, between the second fastening region and the first end section, providing a simple and mechanically robust connection.

The adjustment device comprises the second transmission section. The second transmission section comprises the third fastening region, by which the second transmission section is connected to the free end of the guide element, so that a force transmission between the second transmission section and the guide element is guaranteed. The third fastening region has one or multiple recesses open radially to the central axis, with which a projection oriented radially from the central axis in each case of one or multiple projections of the free end of the guide element engages, so that the second transmission section and the guide element are rotationally secured relative to one another in respect of rotation about the central axis.

The adjustment device comprises the gear section. The gear section is the section of a rotatably mounted gear wheel. Alternatively, the gear section is a section of an element that is rotatably mounted and has one or multiple teeth in each case only in one section, or in multiple sections separate from one another, along its circumference about a rotational axis. In one exemplary arrangement, each of the teeth has the same shape, which simplifies the manufacturing process substantially. For example, each of the teeth may have a sawtooth shape. A sawtooth shape guarantees an efficient engagement of the actuation section with the gear section. The term "gear section" in connection with the present disclosure should be understood to mean that the gear section has multiple engagement possibilities for the engagement of the actuation section along its circumference.

In one exemplary arrangement, the actuation section has an edge, by which the actuation section engages with the gear section. The edge may, for example, be an edge that extends along the axial direction over the section of the gear section with which the edge engages. The edge may therefore be longer than a tooth of the gear section, when viewed along the axial direction. For example, the actuation section may be an edge of an arcuate section, such as a first arcuate section, for example, which will be explained in greater detail later. The edge may, for example, be an edge that does not extend along the axial direction over the section of the gear section, with which the edge engages. The edge may therefore be shorter than a tooth of the gear section, when viewed along the axial direction. For example, the actuation section may be an edge of a free end of an arm section, which will be described in greater detail later.

The gear section is connected to the second transmission section via the internal thread and the external thread, so that rotating the gear section about the central axis extending along the axial direction relative to the second transmission section results in an adjustment of the second transmission section relative to the gear section along the axial direction. With the help of the adjustment of the second transmission section relative to the gear section along the axial direction, a change in length of the combination of the second transmission section and the gear section, which can also be referred to as the transmission-gear unit, along the axial direction can be provided. So when, for example, the gear section is rotated about the central axis relative to the second transmission section in such a manner that the gear section, when viewed from the gear section towards the second transmission section, is moved clockwise about the central axis, this results in an adjustment of the second transmission section relative to the gear section along the axial direction, in such a manner that the third fastening region of the second transmission section is spaced apart further from the gear section along the axial direction.

The gear section is connected to a connecting section, which is connected to a second end section of the adjustment element. The connecting section has a contact surface running about the central axis and oriented against the axial direction, against which the second end section abuts in the axial direction, so that forces can be transmitted, for example along the axial direction, between the connecting section and the second end section, providing a simple and mechanically robust connection. The gear section has a sleeve section connected to the connecting section, which is in turn connected to the second end section of the adjustment element. The teeth of the gear section and the connection point between the gear section and the connecting section can therefore be arranged offset from one another along the axial direction.

The first transmission section and the second transmission section can be arranged relative to one another along the axial direction, in such a manner that the adjustment element is in the first position, in which the first end section and the second end section are spaced apart from one another along the axial direction at the first distance. Moreover, the first transmission section and the second transmission section can be arranged relative to one another along the axial direction, in such a manner that the adjustment element is in the second position, in which the first end section and the second end section are spaced apart from one another along the axial direction at the second distance, which is smaller than the first distance. Changing the arrangement of the first transmission section and the second transmission section relative to one another is therefore suitable for moving the adjustment element successively into the first position and into the second position, for example, into multiple second positions. In one exemplary arrangement, when, for example, the first transmission section and the second transmission section are moved towards one another along the axial direction, the first end section and the second end section are moved towards one another with the help of contact surfaces. Moreover, when the first transmission section and the second transmission section are moved away from one another along the axial direction, spring forces are supplied on account of elastic deformation of a section, or multiple sections, of the adjustment element or elastic energy is supplied on account of the elastic deformations, and the first end section and the second end section are also moved away from one another as a result of this, at least as far as the first position. In the first position, each section of the adjustment element is elastically undeformed, and in the second position, particularly in each second position, a section, or multiple sections, of the adjustment element are elastically deformed, The first end section and the second end section are connected to one another by one, or multiple, elastically deformable sections. The first distance and the second distance are each a distance that lies along the axial direction between the first end section and the second end section.

Multiple second positions and multiple second distances may be provided, wherein each second position is associated with a corresponding second distance. The second distance can take on a minimum value and a maximum value. When the second distance is at the minimum value, in one exemplary arrangement, the first brake pad and the second brake pad can be spaced apart from the respective surfaces of the brake disc and not engage with them. The distance between a specific brake pad and the surface of the brake disc can also be referred to as the clearance of this brake pad, particularly when the second distance is at the minimum value. When the second distance is at the minimum value, in one exemplary arrangement, the clearance of each brake pad is 0.1 mm to 0.6 mm. In one exemplary arrangement, the clearance is between 0.1 mm to 0.4 mm. When the second distance is at the maximum value, which is greater than the minimum value, the first brake pad and the second brake pad are in contact with the corresponding surfaces of the brake disc and engage with them. The difference between the minimum value and the maximum value is 0.1 mm to 0.6 mm, and in one exemplary arrangement, 0.1 mm to 0.4 mm. The difference between the minimum value and the maximum value corresponds to the clearance of one of the brake pads.

By setting the difference between the minimum value and the maximum value, the clearance of one of the brake pads can thereby be set.

When the second distance between the first end section and the second end section is equal to, or greater than, a predefined distance, the actuation section of the adjustment element, for example a free end of the adjustment element, engages with the gear section in such a manner that an increase in the second distance causes the actuation section of the adjustment element to rotate the gear section about the central axis relative to the second transmission section, resulting in the second transmission section moving along the axial direction away from the gear section. As described earlier, with the help of the movement of the second transmission section relative to the gear section along the axial direction and away from the gear section, a lengthening of the combination of the second transmission section and gear section along the axial direction can be provided, thereby ensuring that also the guide element connected to the second transmission section, and therefore also the brake caliper, are correspondingly offset. It can thereby be guaranteed that particularly when there are signs of wear on the brake pads or the brake disc, the clearance when the second distance is at its minimum is less than, or equal to, a predefined maximum clearance value. The fact that when the second distance between the first end section and the second end section is equal to, or greater than, a predefined distance, the actuation section of the adjustment element engages with the gear section, means that it can be guaranteed that the lengthening of the combination of the second transmission section and the gear section is dependent on the predefined distance and only occurs when there are signs of wear on the brake pads or the brake disc, for example, so that with the help of the predefined distance it is possible to guarantee that the clearance when the second distance is at its minimum value is greater than, or equal to, a predefined minimum clearance value. The combination of the second transmission section and the gear section is therefore lengthened in a wear-dependent manner, wherein the clearance remains set at the optimum.

Consequently, a substantially constant clearance can be provided, so that even when there are signs of wear on the brake pads or the brake disk, the clearance is smaller than, or equal to, the predefined maximum clearance value and this maximum clearance value is not exceeded, so as to guarantee a delay-free braking operation. At the same time, it is guaranteed that the clearance is greater than, or equal to, the predefined minimum clearance value and values do not fall below this minimum clearance value, in order to guarantee that when the second distance is at the minimum value, the brake pads are arranged spaced apart from the corresponding surfaces of the brake disc and do not engage with said surfaces.

In summary, it can be established that a floating caliper brake is provided in which, when there are signs of wear on the brake pads or the brake disc, a delay-free braking operation is guaranteed, and when there is no braking operation, sufficient distances between the brake pads and the corresponding surfaces of the brake disc are guaranteed.

In one exemplary arrangement, the adjustment element is arranged in an inner space, and sections of the floating caliper brake that define the inner space are arranged between the adjustment element and the surroundings of the floating caliper brake. By arranging the adjustment element in the inner space, said adjustment element is protected from contaminants and other environmental influences. The sections of the floating caliper brake that define the inner space may be, for example, the brake carrier, the first transmission section, and the second transmission section.

In one exemplary arrangement, the adjustment element comprises a first arcuate section extending from the first end section along an axial direction towards the second end section, wherein an arm section extends from a first section connected to the first arcuate section to a second section comprising the actuation section. The first arcuate section connects the first end section and the second end section to one another and transmits forces between the first end section and the second end section, for example, along the axial direction. The arm section guarantees that the actuation section is arranged spaced apart spatially separate from the first arcuate section and the actuation section can move together with the first arcuate section, or the actuation section can move in accordance with a deformation of the first arcuate section.

In one exemplary arrangement, the first arcuate section is shaped in such a manner that between a first section of the first arcuate section, which is connected to the first end section, and a second section of the first arcuate section, which is connected to the second end section, a third section of the first arcuate section, viewed in a plane along which the central axis extending along the axial direction runs, is arranged on a side facing away from the central axis of a connecting line arranged in the plane between the first section of the first arcuate section and the second section of the first arcuate section. This shape of the first arcuate section guarantees that when the first end section and the second end section are moved towards one another, a deformation of the first arcuate section is promoted in such a way that the third section moves away from the central axis perpendicular to the central axis.

In one exemplary arrangement, the first arcuate section is elastically deformable, so that in the first position, the first arcuate section is elastically undeformed, and in the second position, for example, in each second position, the first arcuate section is elastically deformed, so that the actuation section in the second position, for example, in each second position, is arranged offset, seen in the plane, compared with the first position in the direction of the side of the connecting line facing away from the central axis between the first section and the second section. The elastic deformability of the first arcuate section guarantees that the first arcuate section can transition from an elastically undeformed state into an elastically deformed state and from the elastically deformed state into the elastically undeformed state, wherein the first arcuate section is elastically preloaded along the axial direction in the elastically deformed state, so that the first arcuate section in the second position, for example in each second position, provides a spring force along the axial direction acting on the first end section and the second end section. The position of the actuation section can be set by the elastic deformation of the first arcuate section. The first arcuate section deforms elastically from the first position into the second position, particularly into each second position, in such a manner that the third section in the plane, which can also be referred to as the first plane, moves away from the central axis, and the actuation section on the second section of the arm section moves away from the central axis in a second plane running parallel to the first plane, together with the third section in the first plane.

In one exemplary arrangement, the first arcuate section is elastically deformable, such that multiple second positions are provided, and the displacement of the actuation section in the direction of the side of the connecting line facing away from the central axis increases as the second distance decreases. Multiple different positions of the actuation section can be set by this elastic deformation of the first arcuate section.

In one exemplary arrangement, the third section of the first arcuate section has a curved shape, such that the third section has a concave surface that faces the central axis and a convex surface that faces away from the central axis. Through this curved shape of the first arcuate section, it is guaranteed that when the first end section and the second end section are moved towards one another, a deformation of the first arcuate section is further promoted, in such a way that the third section moves away from the central axis perpendicular to said central axis. For example, this curved shape of the first arcuate section allows the first arcuate section to be produced with a constant wall thickness, which substantially reduces the complexity of the production.

In one exemplary arrangement, the adjustment element further comprises a second arcuate section that extends from the first end section along the axial direction towards the second end section and is elastically deformable, The features and advantages described in connection with the previously described first arcuate section apply, at least analogously, to the second arcuate section.

In one exemplary arrangement, the first end section extends circumferentially about the central axis. An extent circumferentially about the central axis guarantees that the first end section can be connected to other components of the floating caliper brake circumferentially about the central axis or can rest against other components of the floating caliper brake circumferentially about the central axis, so that forces can be transmitted particularly symmetrically with respect to the central axis from the first end section along the axial direction.

In one exemplary arrangement, the second end section extends circumferentially about the central axis. An extent circumferentially about the central axis guarantees that the second end section can be connected to other components of the floating caliper brake circumferentially about the central axis or can rest against other components of the floating caliper brake circumferentially about the central axis, so that forces can be transmitted particularly symmetrically with respect to the central axis from the first end section along the axial direction.

In one exemplary arrangement, the first end section has a first contact surface facing in the circumferential direction about the central axis and/or a second contact surface facing in the circumferential direction about the central axis and/or a third contact surface facing in the circumferential direction about the central axis and/or a fourth contact surface facing in the circumferential direction about the central axis. With the help of the first contact surface, the second contact surface, the third contact surface, and/or the fourth contact surface, the first end section can be secured to prevent rotation about the central axis, in that the first contact surface, the second contact surface, the third contact surface and/or the fourth contact surface rest(s) against another component of the floating caliper brake.

In one exemplary arrangement, the first fastening region of the first transmission section has an external thread, and the brake carrier section to which the first transmission section is connected has an internal thread. The combination of internal and external threads provides a simple and reliable detachable connection between the first transmission section and the brake carrier.

In one exemplary arrangement, the internal thread is provided on the gear section, and the external thread is provided on the second transmission section, and the gear section and the second transmission section are connected to one another via the internal thread and the external thread. It is thereby guaranteed that the gear section can have a space-saving design when viewed along the axial direction, as the teeth of the gear section can extend radially outwards, and the connection to the transmission section can be oriented radially inwards.

In one exemplary arrangement, the external thread is provided on the gear section, and the internal thread is provided on the second transmission section, and the gear section and the second transmission section are connected to one another via the internal thread and the external thread. An alternative arrangement is thereby provided.

In one exemplary arrangement, one or multiple disc springs is/are provided between the first transmission section and the second transmission section, when viewed along the axial direction, The one or multiple disc springs, for example two disc springs, limit(s) a movement of the first transmission section and the second transmission section towards one another, for example when the brake disc is pressed towards the first transmission section in the braked state during sharp cornering. For example, significant lateral accelerations can occur during sharp cornering, causing the first transmission section and the second transmission section to move towards one another, such as moving towards one another by a distance of 1 mm, for example, so that with the help of the disc spring or disc springs, the first transmission section and the second transmission section can be prevented from colliding with one another, directly or via other components, such as gear section 7 or sleeve section 79, for example. With the help of the disc spring or disc springs, damage to the adjustment element 1, the adjustment device 3, and/or the floating caliper brake, or damaging stresses in the adjustment element 1, the adjustment device 3, and/or the floating caliper brake 5 can be avoided. The one disc spring or the multiple disc springs is/are preferably arranged between the first transmission section and the gear section, so that a movement of the first transmission section and the gear section towards one another is limited, and a movement of the first transmission section and the second transmission section towards one another is thereby limited.

In one exemplary arrangement, between a surface of the second transmission section facing in the axial direction and a surface of the brake carrier section, in which the bore section is provided, facing away from the axial direction, a third distance is provided which is greater than a maximum thickness that defines a wearable section of one of the brake pads or of the brake pads. The choice of the third distance guarantees that the second transmission section has sufficient clearance within the brake carrier for adjustment to be guaranteed when the brake pads wear.

In one exemplary arrangement, the floating caliper brake also comprises a return spring that is attached to the brake caliper and rests against the brake carrier in such a manner that the return spring provides a force acting on the brake carrier in the axial direction and on the brake caliper against the axial direction. The return spring guarantees that the brake caliper is moved in respect of the brake carrier against the axial direction or that the brake caliper is held in respect of the brake carrier against the axial direction.

In addition to the section already described, the floating caliper brake may comprise a substantially identical further section that is arranged perpendicular to the axial direction on an opposite side of the rotational axis of the brake disc and for which the features and advantages described in connection with the section already described apply at least analogously. Therefore, in addition to the section already described, the floating caliper brake may comprise the substantially identical further section, which is preferably arranged offset along a plane, along which a mounted brake disc extends.

The floating caliper brake may comprise two adjustment devices, two guide elements, and two bore sections, each of which is substantially identical, and at least the two guide elements and the two bore sections each extend parallel to one another and to the axial direction. Forces can therefore be transmitted to two sections of the brake carrier spaced apart from one another perpendicular to the axial direction in each case between the guide elements and the sections of the brake carrier, and at the same time, a relative movement along the axial direction can be guaranteed between the guide elements and the sections of the brake carrier. Forces caused by the weight of the brake caliper, the weight of an adjustment device, vibrations, deformation forces, or even due to a braking operation, can be transmitted via the respective fastening regions of the corresponding guide elements to two sections of the brake caliper spaced apart from one another, and from there, through contact of the corresponding section of the guide element with a corresponding inner surface of a bore section, to the brake carrier, particularly perpendicular to the axial direction, and from there to the vehicle component.

In an alternative exemplary arrangement, the floating caliper brake has only one adjustment device, two guide elements, and two bore sections.

Perpendicular to the axial direction, the floating caliper brake therefore has an adjustment device on a first side of the rotational axis of the brake disc and no adjustment device on a second side of the rotational axis of the brake disc opposite the first side.

In connection with the present disclosure, the term "axial direction" is used in different contexts. For example, it is provided that the brake caliper can be guided relative to the brake carrier along the axial direction. The use of "along" in connection with the axial direction does not, in particular, include any restrictive directional indication, meaning that the brake caliper can be guided relative to the brake carrier both in the axial direction and against the axial direction, for example. The use of "in" or "against" in connection with the axial direction includes, for example, a directional indication, meaning that a surface facing in the axial direction is oriented in such a manner that the surface faces in the direction of the axial direction, for example, and a surface that faces against the axial direction is oriented in such a manner that the surface faces in the direction against the axial direction, for example.

BRIEF DESCRIPTION OF DRAWINGS

Further features, advantages, and possible applications of the present disclosure will become apparent from the following description of the exemplary arrangements and the figures. In this case, all features described and/or depicted individually and in any combination form the subject matter of the disclosure, irrespective of their composition in the individual claims or the references thereof. Furthermore, the same reference signs refer to the same or similar objects in the figures.

DETAILED DESCRIPTION

Figure 1:
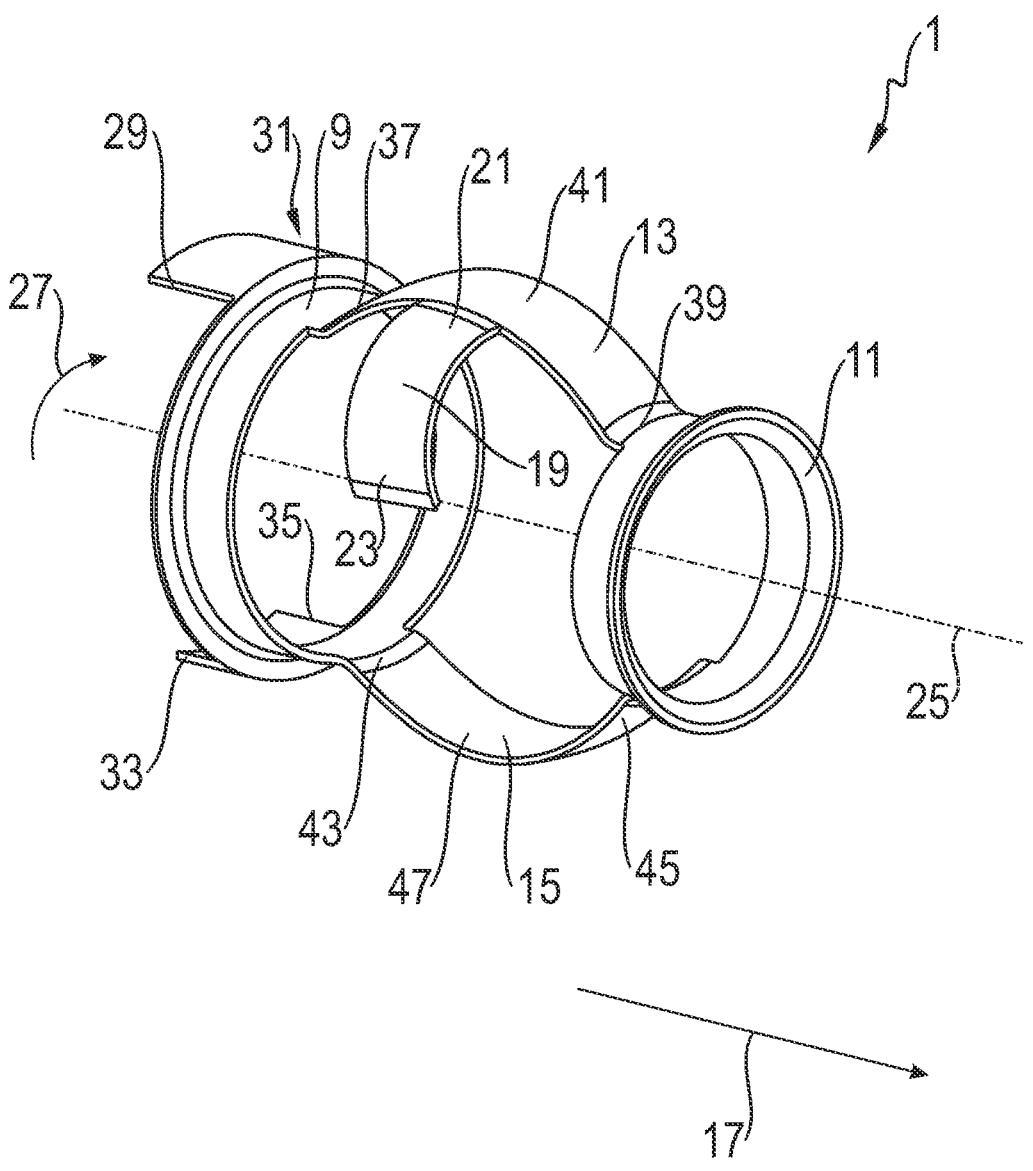
FIG. 1 shows a schematic representation of an adjustment element 1 of an adjustment device in an exemplary arrangement of a floating caliper brake according to the disclosure.
Figure 7:
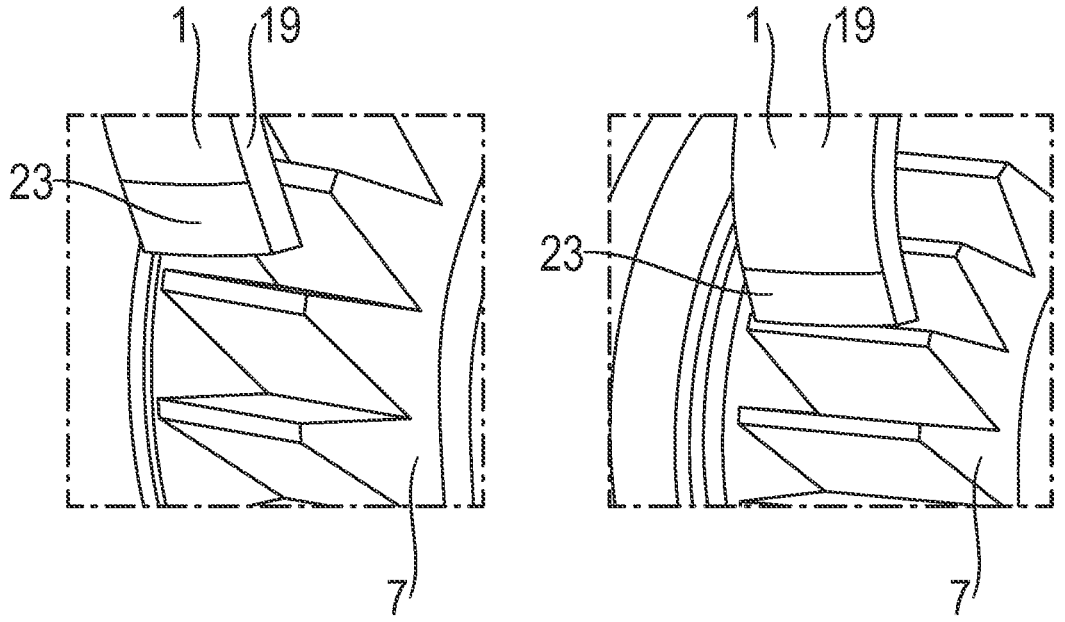
FIG. 7 shows a schematic representation of a section of a gear section of the adjustment device in the exemplary arrangement of the floating caliper brake according to the disclosure.
Figure 8:
FIG. 8 shows two schematic representations of the adjustment device in the exemplary arrangement of the floating caliper brake according to the disclosure.
Figure 9:
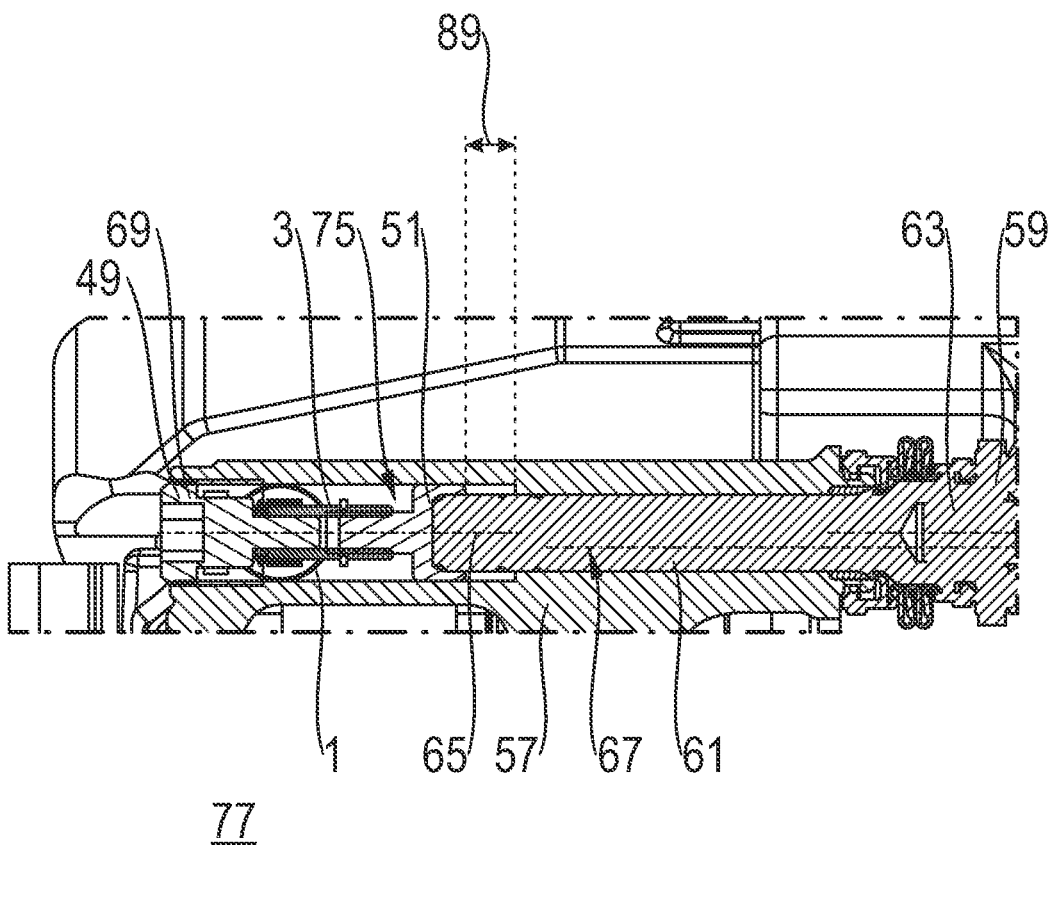
FIG. 9 shows a schematic representation of the adjustment device in the exemplary arrangement of the floating caliper brake according to the disclosure.
Figure 9:
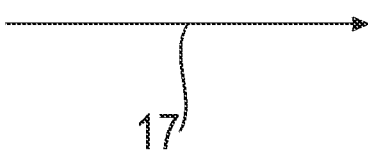
Figure 10:
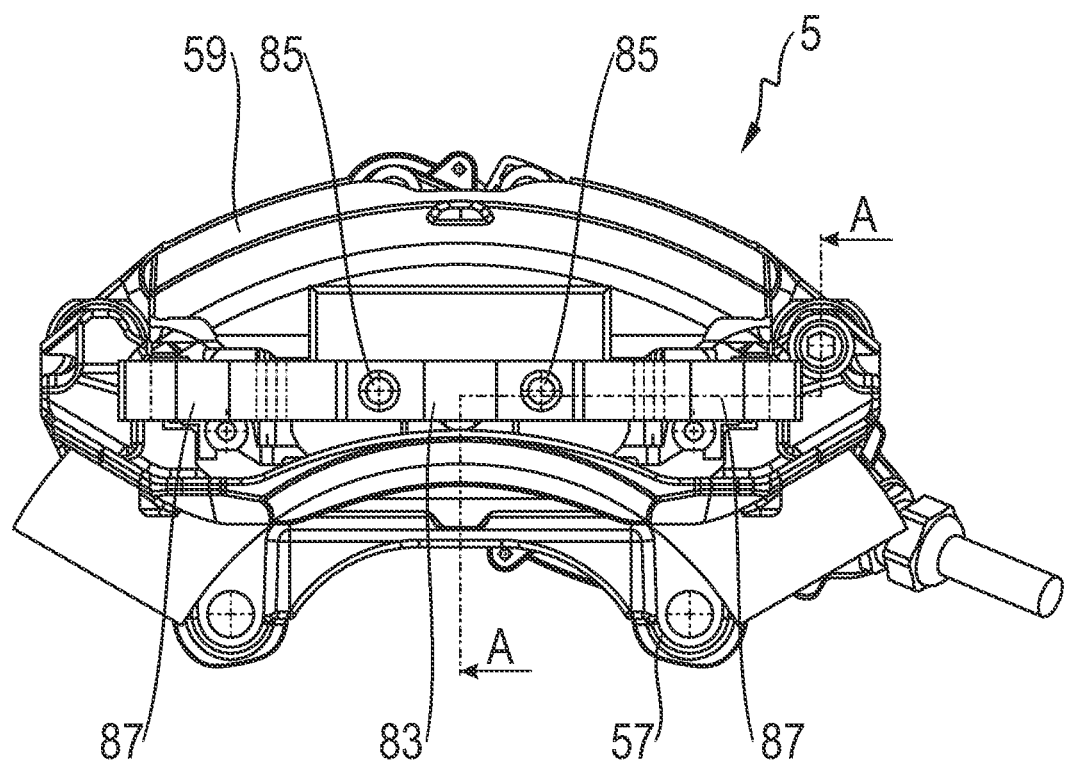
FIG. 10 shows a schematic representation of the floating caliper brake 5 according to the disclosure.

FIG. 1 shows a schematic representation of an adjustment element 1 of an adjustment device 3 in an exemplary arrangement of a floating caliper brake 5 according to the disclosure. FIGS. 2 to 6 show schematic representations of the adjustment device 3 in the exemplary arrangement of the floating caliper brake 5 according to the disclosure. FIG. 7 shows a schematic representation of a section of a gear section 7 of the adjustment device 3 in the exemplary arrangement of the floating caliper brake 5 according to the disclosure. FIG. 8 shows two schematic representations of the adjustment device 3 in the exemplary arrangement of the floating caliper brake 5 according to the disclosure. FIG. 9 shows a schematic representation of the adjustment device 3 in the exemplary arrangement of the floating caliper brake 5 according to the disclosure and FIG. 10 shows a schematic representation of the floating caliper brake 5 according to the disclosure.

The adjustment element 1 comprises a first end section 9 and a second end section 11, with which the adjustment element 1 can be connected to other components of the floating caliper brake 5 or with which the adjustment element 1 can rest against other components of the floating caliper brake 5.

Furthermore, the adjustment element 1 has a first arcuate section 13 and a second arcuate section 15. The first arcuate section 13 extends from the first end section 9 along an axial direction 17 towards the second end section 11. The second arcuate section 15 likewise extends from the first end section 9 along the axial direction 17 towards the second end section 11. The first arcuate section 13 and the second arcuate section 15 connect the first end section 9 and the second end section 11 to one another and transmit forces between the first end section 9 and the second end section 11, for example along the axial direction 17. Moreover, the adjustment element 1 has an arm section 19. The arm section 19 extends from a first section 21 connected to the first arcuate section 13 towards a second section 23 having a free end of the adjustment element 1. The free end of the adjustment element 1 is an example of an actuation section of the adjustment element 1, which will be dealt with in greater detail later.

The adjustment element 1 may be in a first position, in which the first end section 9 and the second end section 11 are spaced apart from one another along the axial direction 17 at a first distance. Moreover, the adjustment element 1 may be in a second position, in which the first end section 9 and the second end section 11 are spaced apart from one another along the axial direction 17 at a second distance 81, wherein the second distance 81 is smaller than the first distance. In one exemplary arrangement, multiple second positions and multiple second distances are provided, wherein each second position is assigned a corresponding second distance 81. The adjustment element 1 may therefore be in multiple second positions in succession, in which the first end section 9 and the second end section 11 are spaced apart from one another along the axial direction 17 at a corresponding second distance 81, wherein each of the second distances 81 is smaller than the first distance. The first arcuate section 13 and the second arcuate section 15 are elastically deformable, such that in the first position, the first arcuate section 13 and the second arcuate section 15 are elastically undeformed, and in the second position, particularly in every second position, the first arcuate section 13 and the second arcuate section 15 are elastically deformed. The elastic deformability of the first arcuate section 13 and the second arcuate section 15 guarantees that both the first arcuate section 13 and the second arcuate section 15 can transition from an elastically undeformed state into an elastically deformed state, and from the elastically deformed state into the elastically undeformed state, wherein both the first arcuate section 13 and the second arcuate section 15 are elastically preloaded in the elastically deformed state along the axial direction 17, so that the first arcuate section 13 and the second arcuate section 15 each provide a spring force along the axial direction 17 in the second position, particularly in each second position, which acts on the first end section 9 and the second end section 11. In one exemplary arrangement, saying that the first arcuate section 13 and the second arcuate section 15 are elastically deformable means that with a predefined deformation of the first arcuate section 13 and the second arcuate section 15, the deformation consists exclusively of an elastic deformation component and there is no plastic deformation component, so that both the first arcuate section 13 and the second arcuate section 15 can assume different, purely elastic, deformation states depending on the second distance 81 at which the first end section 9 and the second end section 11 are spaced apart from one another along the axial direction 17.

For example, when the adjustment element 1 is not mounted and there are no forces acting on the first end section 9 and the second end section 11 along the axial direction 17, as shown in FIG. 1, the adjustment element 1 is in the first position, in which the first end section 9 and the second end section 11 are spaced apart from one another along the axial direction 17 at the first distance. In one exemplary arrangement, when the adjustment element 1 is not mounted and there are no forces acting on the first end section 9 and the second end section 11 along the axial direction 17, as shown in FIG. 1, the first arcuate section 13 and the second arcuate section 15 are elastically undeformed.

When the adjustment element 1 is mounted and forces act on the first end section 9 and the second end section 11 along the axial direction 17, as shown in FIGS. 5, 6, 8, and 9, for example, the adjustment element 1 is in one of the second positions, in which the first end section 9 and the second end section 11 are spaced apart from one another along the axial direction 17 by one of the second distances 81. When the adjustment element 1 is mounted and there are forces acting on the first end section 9 and the second end section 11 along the axial direction 17, the first arcuate section 13 and the second arcuate section 15 are elastically deformed. As will be described in detail later on, the adjustment element 1 can therefore assume multiple second positions in the mounted state, in which the first end section 9 and the second end section 11 are spaced apart from one another along the axial direction 17 at different second distances. In each second position, the first arcuate section 13 and the second arcuate section 15 are elastically deformed.

FIG. 1 shows a central axis 25 extending along the axial direction 17. Both the first end section 9 and the second end section 11 each extend circumferentially about the central axis 25. Extending circumferentially about the central axis 25 ensures that both the first end section 9 and the second end section 11 can be connected to other components of the floating caliper brake 5 circumferentially about the central axis 25, or can rest against other components of the floating caliper brake 5 circumferentially about the central axis, so that forces can be transmitted symmetrically to the central axis 25 from the first end section 9 and the second end section 11 along the axial direction 17.

The first end section 9 has a first contact surface 29 facing in the circumferential direction 27 about the central axis 25, a second contact surface 31 facing in the circumferential direction 27 about the central axis 25, a third contact surface 33 facing in the circumferential direction 27 about the central axis 25, and a fourth contact surface 35 facing in the circumferential direction 27 about the central axis 25. With the help of the first contact surface 29, the second contact surface 31, the third contact surface 33, and the fourth contact surface 35, the first end section 9 can be secured to prevent rotation about the central axis 25, in that the first contact surface 29, the second contact surface 31, the third contact surface 33, and/or the fourth contact surface 35 rest(s) against another component of the floating caliper brake 5.

The first arcuate section 13 has a first section 37 connected to the first end section 9, a second section 39 connected to the second end section 11, and a third section 41 arranged between the first section 37 and the second section 39. The first arcuate section 13 is shaped in such a manner that the third section 41, when viewed in a plane, which can also be referred to as the first plane and along which the central axis 25 runs, is arranged on a side facing away from the central axis 25 of a connecting line between the first section 37 and the second section 39, which connecting line is arranged in the first plane. This shape of the first arcuate section 13 guarantees that when the first end section 9 and the second end section 11 are moved towards one another, deformation of the first arcuate section 13 is promoted in such a way that the third section 41 moves away from the central axis 25 perpendicular to said central axis 25. The third section 41 of the first arcuate section 13 is curved in shape, such that the third section 41 has a concave surface facing the central axis 25 and a convex surface facing away from the central axis 25. This curved shape of the first arcuate section 13 ensures that when the first end section 9 and the second end section 11 are moved towards one another, deformation of the first arcuate section 13 is further promoted in such a way that the third section 41 moves away from the central axis 25 perpendicular to the central axis 25. This curved shape of the first arcuate section 13 allows the first arcuate section 13 to be produced with a constant wall thickness, which substantially reduces the complexity of the production.

The second arcuate section 15 has a first section 43 connected to the first end section 9, a second section 45 connected to the second end section 11, and a third section 47 arranged between the first section 43 and the second section 45. The second arcuate section 15 is shaped in such a manner that the third section 47, when viewed in a plane, which can also be referred to as the second plane and along which the central axis 25 runs, is arranged on a side facing away from the central axis 25 of a connecting line between the first section 43 and the second section 45, which connecting line is arranged in the second plane. This shape of the second arcuate section 15 guarantees that when the first end section 9 and the second end section 11 are moved towards one another, deformation of the second arcuate section 15 is promoted in such a way that the third section 47 moves away from the central axis 25 perpendicular to said central axis 25. In the example shown here, the first plane corresponds to the second plane. However, it is also possible to have exemplary embodiments in which the first plane and the second plane are different planes, The third section 47 of the second arcuate section 15 is curved in shape, such that the third section 47 has a concave surface facing the central axis 25 and a convex surface facing away from the central axis 25. This curved shape of the second arcuate section 15 ensures that when the first end section 9 and the second end section 11 are moved towards one another, deformation of the second arcuate section 15 is further promoted in such a way that the third section 47 moves away from the central axis 25 perpendicular to the central axis 25. This curved shape of the second arcuate section 15 allows the second arcuate section 15 to be produced with a constant wall thickness, which substantially reduces the complexity of the production.

As described above, the adjustment element 1 may be in a first position, in which the first end section 9 and the second end section 11 are spaced apart from one another along the axial direction 17 at a first distance. Moreover, the adjustment element 1 may also be in multiple second positions, in which the first end section 9 and the second end section 11 are spaced apart from one another along the axial direction 17 at a corresponding second distance 81, wherein each of the second distances is smaller than the first distance.

The first arcuate section 13 is elastically deformable, so that in the first position, the first arcuate section 13 is elastically undeformed, and in each of the second positions, the first arcuate section 13 is elastically deformed, so that the free end of the adjustment element 1 in each second position is arranged offset, viewed in the first plane, compared with the first position in the direction of the side of the connecting line facing away from the central axis 25 between the first section 37 and the second section 39. The elastic deformation of the first arcuate section 13 therefore allows for the position of the free end of the adjustment element 1 to be set. In the example shown here, the first arcuate section 13 elastically deforms from the first position into each of the second positions, in such a way that the third section 41 moves away from the central axis 25 in the first plane, and the free end on the second section 23 of the arm section 19 moves away from the central axis 25 in a plane running parallel to the first plane, together with the third section 41 in the first plane. The first arcuate section 13 is elastically deformable, such that the multiple second positions are provided, and the displacement of the free end in the direction of the side of the connecting line facing away from the central axis 25 increases as the second distance 81 decreases. This elastic deformation of the first arcuate section 13 therefore enables multiple different positions of the free end of the adjustment element 1 to be set.

As described above, FIGS. 2 to 6 show schematic representations of the adjustment device 3 in the embodiment of the floating caliper brake 5 according to the disclosure. The adjustment device 3 comprises the adjustment element 1, gear section 7, a first transmission section 49, a second transmission section 51, two disc springs 53, and a connecting section 55, as described above. As also described above, FIGS. 8 and 9 show schematic representations of the adjustment device 3 in the exemplary arrangement of the floating caliper brake 5 according to the disclosure. The representation at the top in FIG. 8 shows a sectional view along the line A-A, and the representation at the bottom in FIG. 8 shows a sectional view along the line B-B. The representation of the adjustment device 3 in FIG. 9 is shown in a mounted state. As also described above, FIG. 10 shows a schematic representation of the floating caliper brake 5 according to the disclosure.

The floating caliper brake 5 comprises a brake carrier 57, a brake caliper 59, and a guide mechanism. The brake carrier 57 has a fastening arrangement for fastening the brake carrier 57 to a component, such as a wheel carrier, of a vehicle. The fastening arrangement of the brake carrier 57 guarantees that forces generated by a braking operation can be transferred from the brake carrier 57 to the component of the vehicle. The brake caliper 59 has a fastening arrangement for fastening an adjustment device to the brake caliper 59. The adjustment device will be described in greater detail later. The guide mechanism is designed to guide the brake caliper 59 relative to the brake carrier 57 along the axial direction 17, which is perpendicular to the plane of the drawing in FIG. 10. In connection with the present disclosure, the axial direction 17 relates to a mounted state in which the brake carrier 57, the brake caliper 59, the guide mechanism, and a brake disc are mounted. In this mounted state, the axial direction 17 extends parallel to the rotational axis of the brake disc.

The guide mechanism comprises a guide element 61, which extends from a fastening region 63, by which the guide element 61 is fastened to a section of the brake caliper 59, towards a free end 65. The fastening region 63 is connected to the section of the brake caliper 59 in such a way as to prevent a movement of the fastening region 63 and the section of the brake caliper 59 along the axial direction 17 in respect of one another. This guarantees that translation of the guide element 61 along the axial direction 17 relative to the brake caliper 59 is prevented. Additionally, the guide element 61 has a bore section 67 extending along the axial direction 17 in a section of the brake carrier 57. The fact that the bore section 67 extends in the section of the brake carrier 57 along the axial direction 17 means it is guaranteed that the bore section 67 can be used to guide the brake caliper 59 relative to the brake carrier 57 along the axial direction 17. A section of the guide element 61 arranged between the fastening region 63 and the free end 65 is arranged in the bore section 67. In particular, the section of the guide element 61 arranged between the fastening region 63 and the free end 65 is arranged in the bore section 67, in such a way that allows forces perpendicular to the axial direction 17 to be transferred between the guide element 61 and the section of the brake carrier 57, and at the same time a relative movement between the guide element 61 and the section of the brake carrier 57 along the axial direction 17 is guaranteed. Through the fastening region 63 of the guide element 61, forces generated by the weight of the brake caliper 59, by the weight of an adjustment device, by vibrations, deformation forces, or also by a braking operation can be transferred from the brake caliper 59 to the guide element 61, and from there through contact of the section of the guide element 61 arranged between the fastening region 63 and the free end 65 with an inner surface of the bore section 67, to the brake carrier 57, particularly perpendicular to the axial direction 17, and from there to the vehicle component.

As described above, the adjustment device 3 comprises the first transmission section 49. The first transmission section 49 has a first fastening region 69 by which the first transmission section is connected to a brake carrier section. The first fastening region 69 has an external thread, as shown in FIG. 9, which is not depicted in FIGS. 2 to 6 and 8. The brake carrier section, to which the first transmission section 49 is connected, has an internal thread. The combination of internal thread and external thread provides a simple and reliable detachable connection between the first transmission section 49 and the brake carrier 57. In additional, the first transmission section 49 has a second fastening region 71, by which it is connected to the first end section 9 of the adjustment element 1. The second fastening region 71 has four contact surfaces oriented in the circumferential direction 27 about the central axis 25, wherein a contact surface in each case of the first, second, third, and fourth contact surfaces 29, 31, 33, 35 of the first end section 9 of the adjustment element 1 is in contact with each of the four contact surfaces of the second fastening region 71, so that the adjustment element 1 and the first transmission section 49 are rotationally secured relative to one another in respect of rotation about the central axis 25. In addition, the second fastening region 71 has a contact surface running about the central axis 25 and oriented in the axial direction 17, against which the first end section 9 abuts along the axial direction 17, for example, against the axial direction 17, so that forces can be transmitted, for example, along the axial direction 17, between the second fastening region 71 and the first end section 9, providing a simple and mechanically robust connection.

As also described above, the adjustment device 3 comprises the second transmission section 51. The second transmission section 51 comprises a third fastening region 73, by which the second transmission section is connected to the free end 65 of the guide element 61. The third fastening region 73 has four recesses open radially to the central axis 25, with which a projection pointing radially from the central axis 25 in each case from four projections of the free end 65 of the guide element 61 engages, so that the second transmission section 51 and the guide element 61 are rotationally secured relative to one another in respect of rotation about the central axis 25.

FIG. 9 shows that the adjustment element 1 is arranged in an inner space 75, and sections of the floating caliper brake 5 that define the inner space 75 are arranged between the adjustment element 1 and the surroundings 77 of the floating caliper brake 5. By arranging the adjustment element 1 in the inner space 75, said adjustment element is protected from contaminants and other environmental influences. In the present example, the sections of the floating caliper brake 5 that define the inner space 75 are the brake carrier 57, the first transmission section 49, and the second transmission section 51.

Figure 2:
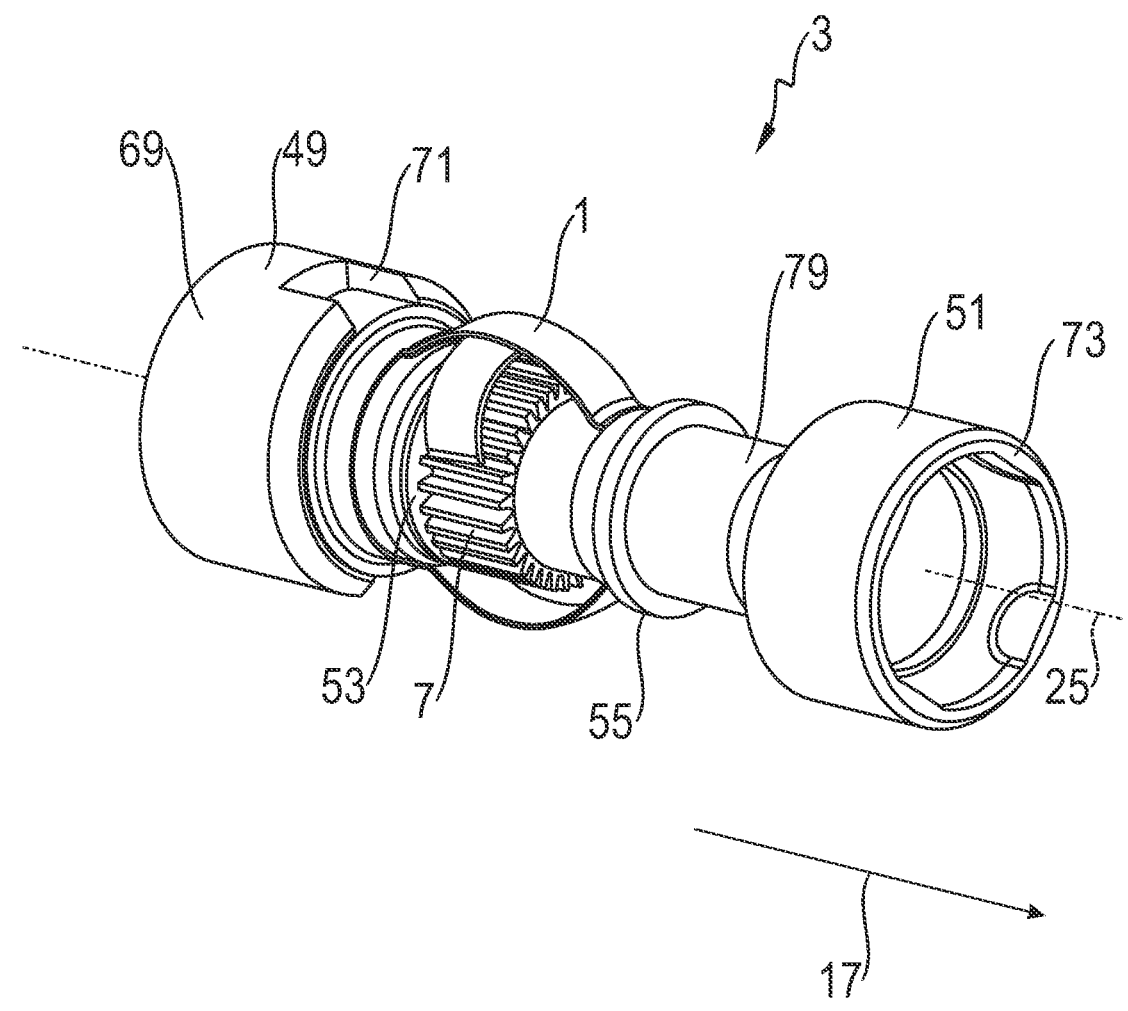
FIGS. 2 to 6 show schematic representations of the adjustment device in the exemplary arrangement of the floating caliper brake according to the disclosure.
Figure 3:
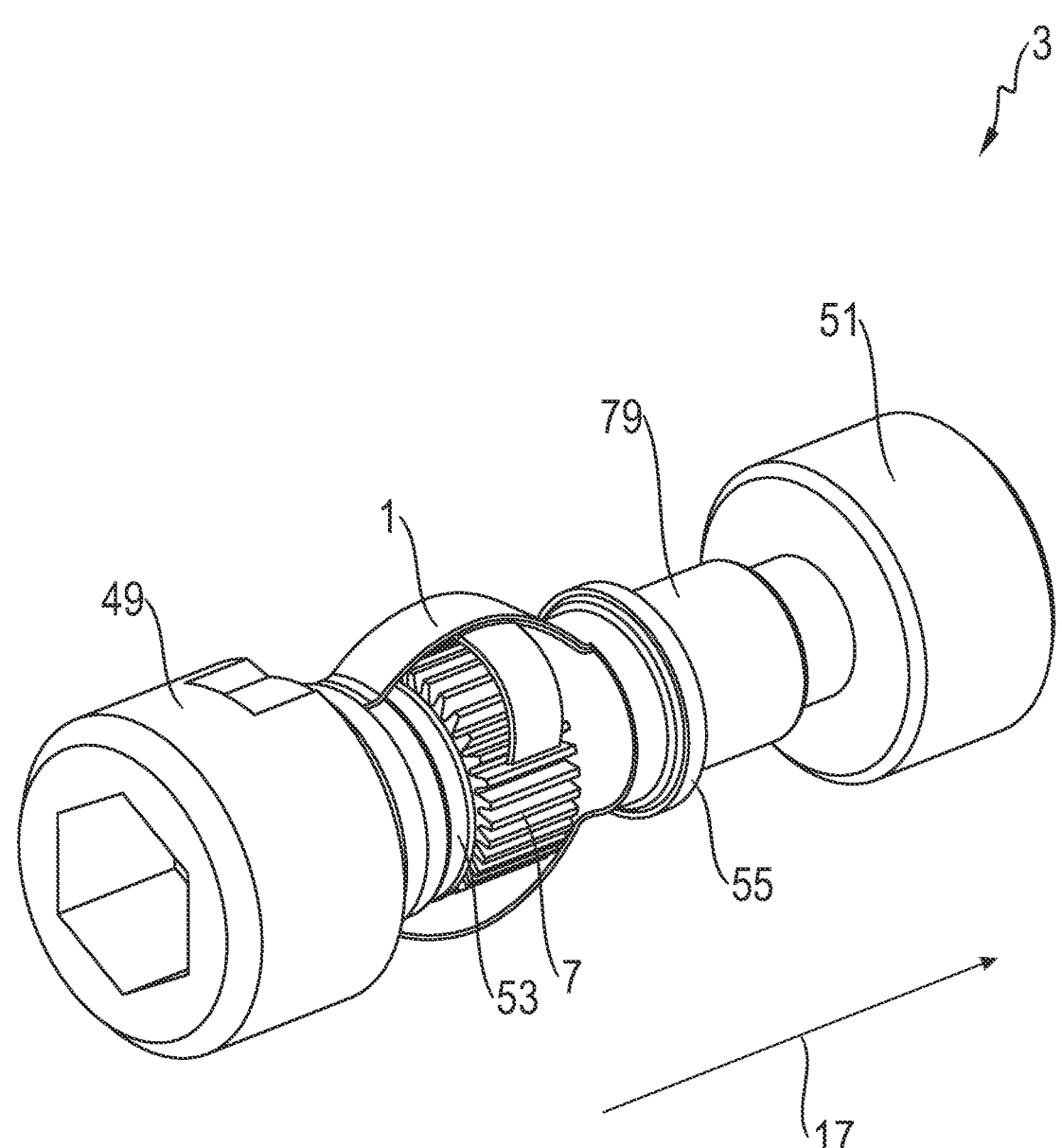
Figure 4:
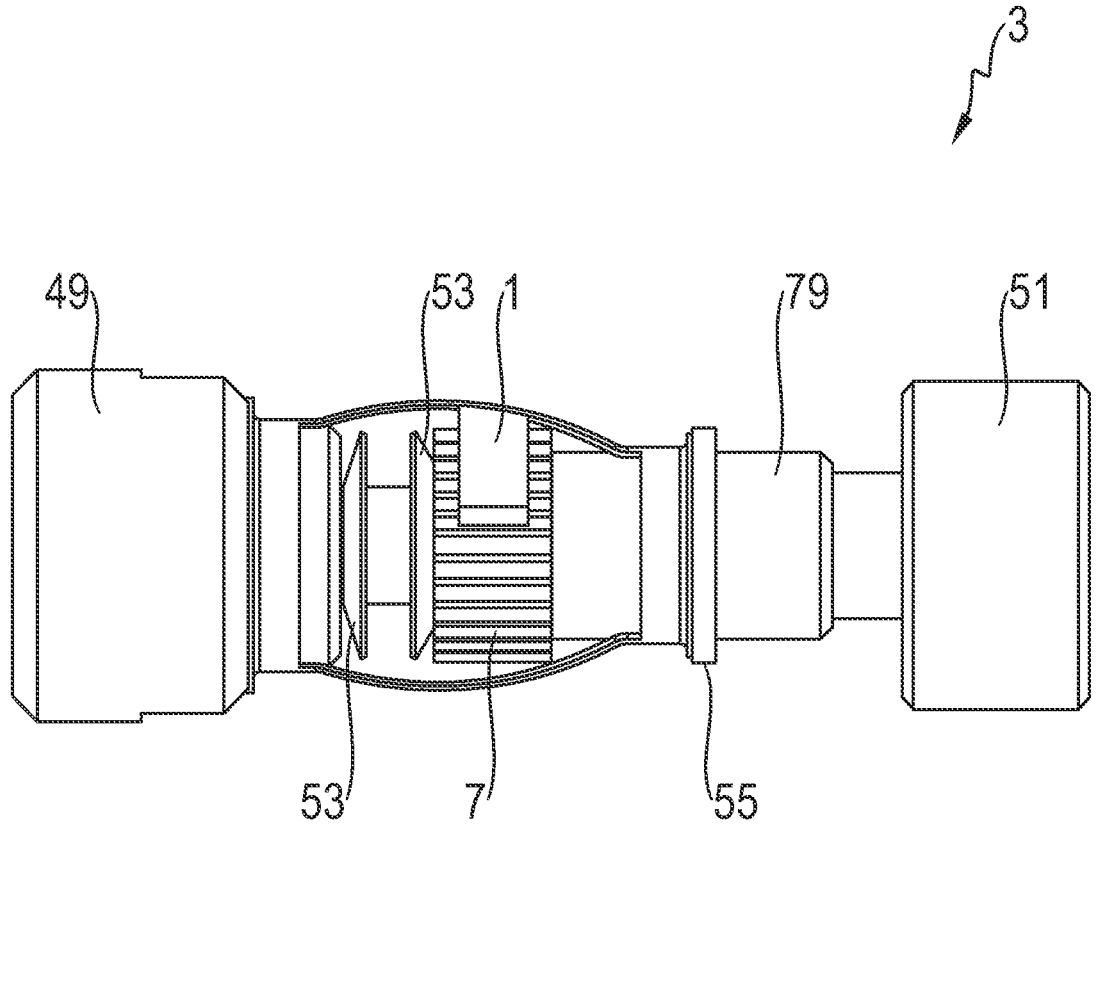

As described above, the adjustment device 3 comprises the gear section 7 and the second transmission section 51. The gear section 7 is connected to the second transmission section 51 via an internal thread and an external thread, so that a rotation of the gear section 7 about the central axis 25 relative to the second transmission section 51 results in an adjustment of the second transmission section 51 relative to the gear section 7 along the axial direction 17. By adjusting the second transmission section 51 relative to the gear section 7 along the axial direction 17, particularly in the axial direction 17, a change in length of the combination of the second transmission section 51 and gear section 7 along the axial direction 17 can be provided. For example, when the gear section 7 is rotated about the central axis 25 relative to the second transmission section 51 in such a manner that the section of the gear section 7 shown at the front in FIG. 2 is moved downward in FIG. 2, this results in an adjustment of the second transmission section 51 relative to the gear section 7 along the axial direction 17, for example, in the axial direction 17, so that the third fastening region 73 of the second transmission section 51 is spaced further apart from the gear section 7 along the axial direction 17. As shown in FIG. 8, in the exemplary arrangement depicted here, the internal thread is provided on a sleeve section 79 of the gear section 7, and the external thread is provided on the second transmission section 51, wherein the gear section 7 and the second transmission section 51 are connected to one another via the internal thread and the external thread. In an exemplary arrangement that is not shown, the external thread is provided on the gear section 7, and the internal thread is provided on the second transmission section 51, and the gear section 7 and the second transmission section 51 are connected to one another via the internal thread and the external thread.

Furthermore, the sleeve section 79 of the gear section 7 is connected to the connecting section 55, which is connected to the second end section 11 of the adjustment element 1. The connecting section 55 has a contact surface running about the central axis 25 and oriented along the axial direction 17, particularly against the axial direction 17, against which the second end section 11 abuts along the axial direction 17, particularly in the axial direction 17, so that forces can be transmitted, particularly along the axial direction 17, between the connecting section 55 and the second end section 11, providing a simple and mechanically robust connection.

Figure 5:
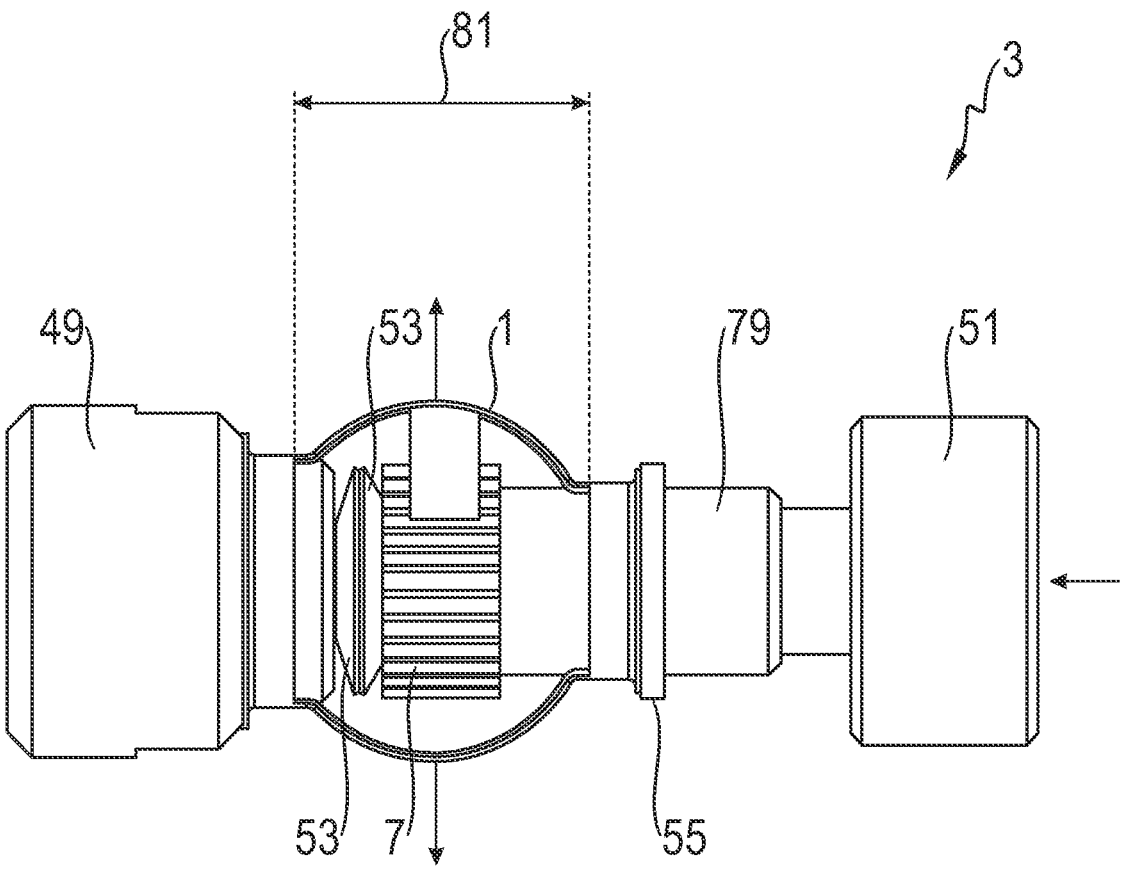
Figure 5:
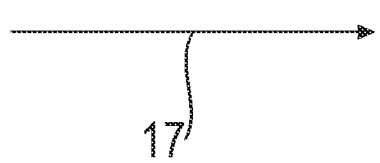
Figure 6:
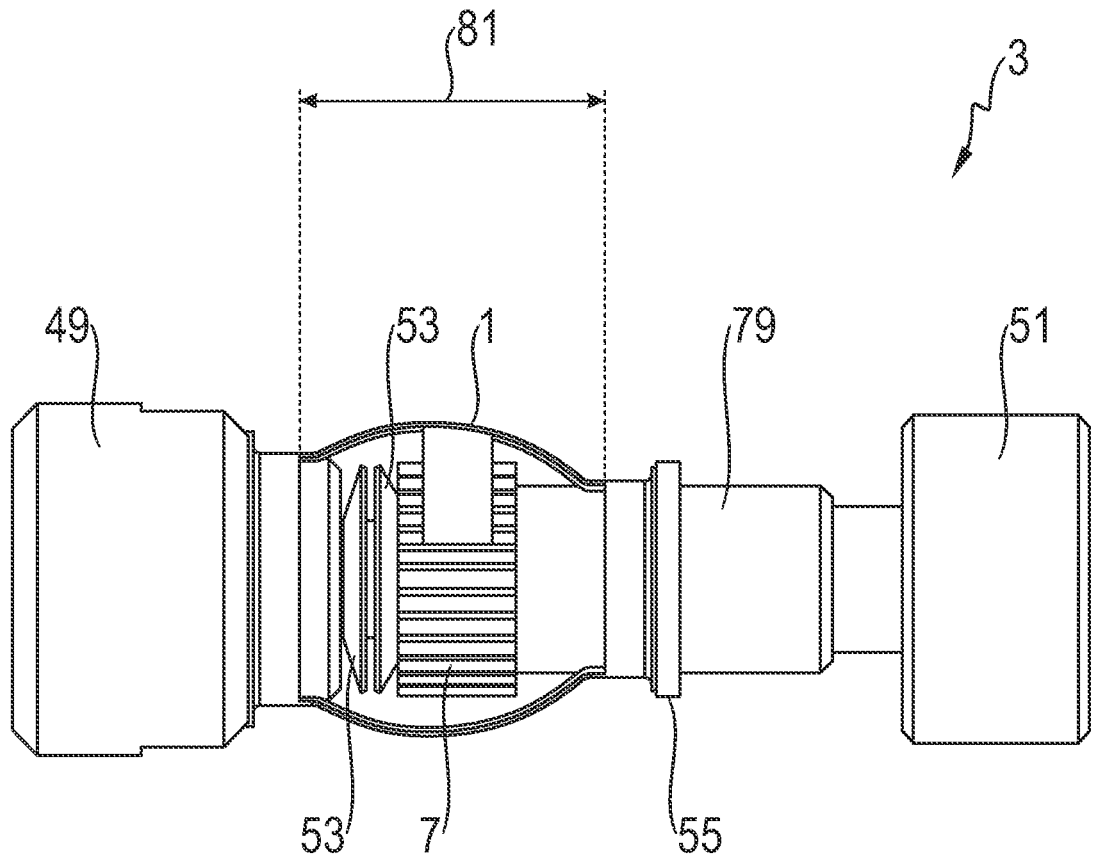
Figure 6:
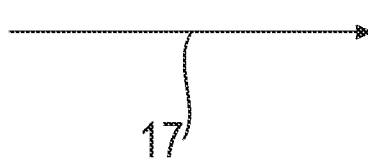

The first transmission section 49 and the second transmission section 51 can be arranged relative to one another along the axial direction 17, in such a manner that the adjustment element 1 is in the first position, as previously described, in which the first end section 9 and the second end section 11 are spaced apart from one another along the axial direction 17 at the first distance. This is the case when the adjustment device 3 is not mounted, meaning that there are no forces acting on the first transmission section 49 and the second transmission section 51 along the axial direction 17, in such a manner that the first transmission section 49 and the second transmission section 51 are moved apart from one another, in the event that only these forces are acting on the first transmission section 49 and the second transmission section 51. This is illustrated by way of example in FIG. 4. Moreover, the first transmission section 49 and the second transmission section 51 can be arranged relative to one another along the axial direction 17, in such a manner that the adjustment element 1 is in one of the previously described second positions, in which the first end section 9 and the second end section 11 are spaced apart from one another along the axial direction 17 at a corresponding second distance 81, which is smaller than the first distance. This is exemplified in FIGS. 5, 6, 8, and 9. Changing the arrangement of the first transmission section 49 and the second transmission section 51 relative to one another is therefore suitable for moving the adjustment element 1 into the first position and into each of the second positions one after the other. This is guaranteed by the fact that the second fastening region 71 comprises the contact surface running about the central axis 25 and oriented in the axial direction 17, against which the first end section 9 abuts against the axial direction 17, and the connecting section 55 comprises the contact surface running about the central axis 25 and oriented against the axial direction 17, against which the second end section 11 abuts in the axial direction 17. Therefore, when the first transmission section 49 and the second transmission section 51 are moved towards one another along the axial direction 17, the first end section 9 and the second end section 11 are also moved towards one another with the help of the contact surfaces, in turn resulting in an elastic deformation of the first arcuate section 13 and the second arcuate section 15 away from the central axis 25. In the first position, the first arcuate section 13 and the second arcuate section 15 are namely elastically undeformed, and in each of the second positions, the first arcuate section 13 and the second arcuate section 15 are elastically deformed. When the first transmission section 49 and the second transmission section 51 are moved away from one another along the axial direction 17, due to the spring forces produced by the elastic deformation of the first arcuate section 13 and the second arcuate section 15 or the elastic energy present due to the elastic deformations, the first end section 9 and the second end section 11 are also moved apart from one another, at least up to the first position, so that the first arcuate section 13 and the second arcuate section 15 each deform back again towards the central axis 25. This deformation towards the central axis 25 is depicted from FIG. 5, which shows a second position before this deformation, to FIG. 6, which shows a second position after this deformation. The first arcuate section 13 deforms back in the direction of a third plane, along which the central axis 25 extends and which runs perpendicular to the first plane. Since the first arcuate section 13 deforms back in the direction of the third plane, and the arm section 19 is fastened to the first arcuate section 13, the arm section 19 likewise moves in the direction of the third plane with its free end. In the left illustration in FIG. 7, it is shown that the free end is arranged further away from the third plane than in the right illustration in FIG. 7. The second section 23 of the arm section 19 moves together with the first arcuate section 13 in the direction of the third plane until the free end engages with the gear section 7 and causes it to rotate about the central axis 25. As described above, multiple second positions are provided, as shown by way of example in FIGS. 5 and 6, in which each figure shows a corresponding second position. For each second position, a corresponding second distance 81 is provided, which is smaller than the first distance, wherein the degree of deformation of the first arcuate section 13 and the second arcuate section 15 increases as the second distance 81 decreases, and the distance between the free end and the third plane also increases as the second distance 81 decreases. This is shown by way of example in FIGS. 5 and 6, wherein the second distance 81 in FIG. 5 is smaller than the second distance 81 in FIG. 6, because the connecting section 55, together with the second transmission section 51 and the sleeve section 79, and with the second end section 11 resting on the connecting section 55, are arranged offset along the axial direction 17 compared with FIG. 5.

An aspect of the present disclosure is that when the second distance 81 between the first end section 9 and the second end section 11 is equal to, or greater than, a predefined distance, the free end of the adjustment element 1 engages with the gear section 7 in such a way that when the second distance 81 is increased, the free end of the adjustment element 1 produces a rotation of the gear section 7 about the central axis 25 relative to the second transmission section 51, such that the second transmission section 51 moves away from the gear section 7 along the axial direction 17. The predefined distance guarantees the engagement of the free end of the adjustment element 1 with the gear section 7 starting from a clearly defined second distance 81 between the first end section 9 and the second end section 11. Due to the fact that when the second distance 81 is increased, the free end of the adjustment element 1 produces a rotation of the gear section 7 about the central axis 25 relative to the second transmission section 51, causing the second transmission section 51 to move away from the gear section 7 along the axial direction 17, it is guaranteed that a lengthening of the combination of the gear section 7 and the second transmission section 51 along the axial direction 17 results from the engagement of the free end with the gear section 7.

As described above, the brake caliper 59 comprises the fastening arrangement for fastening the adjustment device to the brake caliper 59. In the mounted state, the adjustment device is fastened to the brake caliper 59. The adjustment device comprises an electromechanical drive unit, which has a first section connected to the fastening arrangement of the brake caliper 59, and a second section movably mounted relative to the first section. In an alternative arrangement, the adjustment device comprises a hydraulic drive unit, which has the first section connected to the fastening arrangement of the brake caliper 59, and the second section movably mounted relative to the first section. Furthermore, the drive unit is designed to drive a relative movement between the first section and the second section. The brake caliper 59 is connected to a first brake pad arranged on a first side of a plane along which a brake disc extends in the mounted state, and the second section of the drive unit is connected to a second brake pad arranged on a second side of the plane opposite to the first side, so that, in the mounted state of the brake disc, by moving the first section and the second section relative to one another along the axial direction 17, the first brake pad can be moved from the first side of the plane in the direction of a first side of the brake disc and thereby brought into contact with the brake disc, and the second brake pad can be moved from the second side of the plane in the direction of a second side of the brake disc and thereby brought into contact with the brake disc. The adjustment device is therefore configured to move the first brake pad, particularly an outer pad, in the direction of and against a surface on the first side of the brake disc, and to move the second brake pad, particularly an inner pad, in the direction of and against a surface on the second side of the brake disc. The fact that the adjustment device is fastened to the brake caliper 59 and the guide mechanism is designed to guide the brake caliper 59 relative to the brake carrier 57 along the axial direction 17 means that the adjustment device, along with the brake caliper 59, is also guided with the help of the guide mechanism relative to the brake carrier 57 along the axial direction 17. This allows optimal positioning of the adjustment device, and therefore also of the first brake pad and the second brake pad, when the two brake pads are moved to the surfaces of the brake disc along the axial direction 17 relative to the brake disc. For example, a relative movement then takes place between the brake carrier 57 and the brake caliper 59 when the first brake pad and the second brake pad are moved towards, or away from, the brake disc along the axial direction 17. When the brake disc rotates about its rotational axis and the first brake pad or the second brake pad engages with a corresponding surface of the brake disc, brake forces between the brake disc and the first and/or second brake pad act particularly perpendicular to the rotational axis, so also perpendicular to the axial direction 17. For example, the brake forces acting perpendicular to the axial direction 17, or at least a large proportion of these brake forces, are typically transmitted via carrier plates, to which the brake pads are fastened, straight to the brake carrier 57 via contact surfaces at which the carrier plates abut against the brake carrier 57. In turn, in the brake caliper 59 forces mainly act along the axial direction 17. The weight of the brake caliper 59, the weight of the adjustment device, vibrations caused by the braking operation, for example, deformation forces, or even a small proportion of the forces caused by the braking operation acting perpendicularly to the axial direction 17 can be transmitted to the guide element 61 via the brake caliper 59 and on to the wheel carrier of the vehicle.

As described above, the adjustment element 1 can be in a first position and in multiple second positions, wherein the position in each case determines the distance between the first end section 9 and the second end section 11 and depends on the respective position of the arrangement of the first transmission section 49 and of the second transmission section 51 relative to one another. Since, as shown in FIG. 9, the first transmission section 49 is connected to the brake carrier 57, and the second transmission section 51 is connected to the guide element 61, which is in turn connected to the brake caliper 59, the arrangement of the brake carrier 57 and the brake caliper 59 along the axial direction 17 relative to one another also determines the distance between the first end section 9 and the second end section 11.

In the mounted state shown in FIG. 9, the adjustment element 1 can be moved into multiple second positions, in which the first arcuate section 13 and the second arcuate section 15 are elastically deformed, and each second position is associated with a corresponding second distance 81.

When the second distance 81 takes on a minimum value, the first brake pad and the second brake pad are arranged spaced apart from the corresponding surfaces of the brake disc and do not engage therewith. The distance between a specific brake pad and the surface of the brake disc, particularly when the second distance 81 takes on the minimum value. can also be referred to as the clearance of this brake pad. In one exemplary arrangement, the clearance of each brake pad is 0.1 mm to 0.6 mm. In another exemplary arrangement, the clearance is 0.1 mm to 0.4 mm when the second distance 81 takes on the minimum value. When the second distance 81 takes on a maximum value that is greater than the minimum value, the first brake pad and the second brake pad come into contact with the corresponding surfaces of the brake disc and engage with them. The difference between the minimum value and the maximum value is 0.1 mm to 0.6 mm. In one exemplary arrangement, the maximum value is 0.1 mm to 0.4 mm. The difference between the minimum value and the maximum value corresponds to the clearance of one of the brake pads. By setting the difference between the minimum value and the maximum value, the clearance of one of the brake pads can therefore be set accordingly.

In general, it is desirable in the case of floating caliper brakes for a consistent clearance to be provided, so that, when there are signs of wear on the brake pads or the brake disc, the clearance when the second distance 81 is at the minimum value is less than, or equal to, a predefined maximum clearance value, such as 0.6 mm or 0.5 mm, and does not exceed this maximum clearance value, in order to ensure delay-free braking and avoid pedal travel extension. At the same time, it is desirable for the clearance when the second distance 81 is at a minimum value to be greater than, or equal to, a predefined minimum clearance value, such as 0.1 mm or 0.2 mm, for example, and not to fall below this minimum clearance value, in order to ensure that when the second distance 81 is at its minimum value, the brake pads are arranged spaced apart from the corresponding surfaces of the brake disc and do not engage therewith.

A substantial advantage of the present disclosure is that the gear section 7 is connected to the second transmission section 51 via the internal thread and the external thread, so that a rotation of the gear section 7 about the central axis 25 relative to the second transmission section 51 results in an adjustment of the second transmission section 51 relative to the gear section 7 along the axial direction 17, particularly in the axial direction 17, and when the second distance 81 between the first end section 9 and the second end section 11 is equal to, or greater than, a predefined distance, the free end of the adjustment element 1 engages with the gear section 7, in such a way that when there is an increase in the second distance 81, the free end of the adjustment element 1 produces a rotation of the gear section 7 about the central axis 25 relative to the second transmission section 51, such that the second transmission section 51 moves away from the gear section 7 along the axial direction 17.

As described above, with the help of the adjustment of the second transmission section 51 relative to the gear section 7 along the axial direction 17 and away from the gear section 7, a lengthening of the combination of the second transmission section 51 and gear section 7 along the axial direction 17 can be provided, so that the guide element 61 connected to the second transmission section 51, and therefore also the brake caliper 59, can also be correspondingly offset. It can thereby be guaranteed that, for example when there are signs of wear on the brake pads or the brake disc, the clearance when the second distance 81 is at its minimum is less than, or equal to, a predefined maximum clearance value. The fact that when the second distance 81 between the first end section 9 and the second end section 11 is equal to, or greater than, a predefined distance, the free end of the adjustment element 1 engages with the gear section 7, means it can be guaranteed that the lengthening of the combination of the second transmission section 51 and the gear section 7 is dependent on the predefined distance and only occurs when there are signs of wear on the brake pads or the brake disc, for example, so that with the help of the predefined distance it is possible to guarantee that the clearance when the second distance 81 is at its minimum value is greater than, or equal to, a predefined minimum clearance value. The combination of the second transmission section 51 and the gear section 7 is therefore lengthened in a wear-dependent manner, wherein the clearance remains set at the optimum.

Furthermore, when viewed along the axial direction 17 between the first transmission section 49 and the second transmission section 51, the two disc springs 53 already referred to are provided, limiting a movement of the first transmission section 49 and the second transmission section 51 towards one another, for example when the brake disc is pressed towards the first transmission section 49 in the braked state during sharp cornering. In the example shown here, the two disc springs 53 are arranged between the first transmission section 49 and the gear section 7, so that a movement of the first transmission section 49 and the gear section 7 towards one another is limited and thereby limiting a movement of the first transmission section 49 and the second transmission section 51 towards one another.

In addition to the components described above, the floating caliper brake 5 in the present invention comprises a return spring 83, as shown in FIG. 10, which is attached at two mounting points 85 to the brake caliper 59 and rests against the brake carrier 57 at two contact points 87. The return spring 83 ensures that the brake caliper 59 is moved in respect of the brake carrier 57 against the axial direction 17, or that the brake caliper 59 is held in respect of the brake carrier 57 against the axial direction 17. The return spring 83 is attached to the brake caliper 59 and rests against the brake carrier 57 in such a way that the return spring 83 provides a force acting on the brake carrier 57 in the axial direction 17, and acting on the brake caliper 59 against the axial direction 17. As previously described, the adjustment device mentioned above can bring the two brake pads into contact with the brake disc. This involves the return spring 83 providing a force that opposes the movement of one of the brake pads in the direction of the brake disc. When the contact between the brake pads and the brake disc is to be released again, the brake pads are moved away from the brake disc again. This involves the return spring 83 providing a force that supports the movement of one of the brake pads in the direction away from the brake disc or completely causing this movement. The force provided by the return spring 83 acts on the brake carrier 57 in the axial direction 17 and therefore also on the first transmission section 49 and the first end section 9, in the axial direction 17 in each case. Moreover, the force provided by the return spring 83 acts on the brake caliper 59 against the axial direction 17 and therefore also on the guide element 61, on the second transmission section 51, and on the second end section 11, against the axial direction 17 in each case. In the mounted state shown in FIG. 9, the return spring 83 therefore provides a force that moves the adjustment element 1 into one of the second positions.

When a braking operation is to be initiated, the brake caliper 59, together with the guide element 61, moves in the axial direction 17, so to the right in FIG. 9. The first arcuate section 13 and the second arcuate section 15 extend along the axial direction 17 and push the gear section 7, the sleeve section 79, and the second transmission section 51 in the axial direction 17. The range by which the gear section 7, the sleeve section 79, and the second transmission section 51 can be moved in the axial direction 17 is limited when there is no brake pad wear, so that the first arcuate section 13 and the second arcuate section 15 continue to remain elastically deformed, and the adjustment element 1 remains in one of the second positions during a braking operation.

When a braking operation is to be ended, which can also be referred to as releasing the brake, the brake caliper 59, together with the guide element 61, moves against the axial direction 17, so to the left in FIG. 9. This movement is supported by a force provided by the return spring 83, or completely caused by this force. The brake caliper 59 is therefore retracted relative to the brake carrier 57 into its initial position and the clearance is restored.

Where there is wear to the brake pad, the brake caliper 59, together with the guide element 61, travels back a greater distance when the brake is actuated, causing the first arcuate section 13 and the second arcuate section 15 to extend further along the axial direction 17 than in the case in which there is no brake pad wear. This more pronounced lengthening of the first arcuate section 13 and the second arcuate section 15, compared with the case in which there is no wear to the brake pad, actuates the gear section 7 via the arm section 19. The arm section 19 can also be referred to as the adjustment arm. In the example shown, the gear section 7 forms a section of a sawtooth ring. With gradual wear to the brake pad, the gear section 7 is gradually rotated about the central axis 25. As described above, the gear section 7 and the second transmission section 51 are coupled to one another via an internal thread and an external thread. Through the gradual rotation of the gear section 7 about the central axis 25, the second transmission section 51 is gradually pushed out of the gear section 7 and the sleeve section 79 in the axial direction 17, so that the combination of gear section 7, sleeve section 79, and second transmission section 51 is gradually lengthened in the axial direction 17, and the brake pad wear is thereby compensated.

As shown in FIG. 9, a third distance 89 is provided between a surface of the second transmission section 51 facing in the axial direction, and a surface of the brake carrier 57 facing against the axial direction, in which brake carrier the bore section 67 is provided, which third distance is oriented along the axial direction 17. In a state in which there is no brake pad wear and a braking operation is performed, meaning that the brake pads are in contact with the brake disc in a non-worn state, the third distance 89 is greater than a maximum thickness that defines a wearable section of one of the brake pads, or of the brake pads. By choosing the third distance 89 it is guaranteed that the second transmission section 51 has sufficient range of movement within the brake carrier 57 to guarantee adjustment in the event of wear to the brake pad. For example, the maximum thickness, viewed along the axial direction, may be 7 mm, and in this case, the third distance 89 may be 7.5 mm.

It should also be mentioned that in addition to the sections shown in the figures, the floating caliper brake 5 comprises a substantially identically designed section in each case, which is arranged offset from the sections shown in the figures, viewed perpendicularly to the axial direction 17, and to which the features and advantages described in connection with the sections shown in the figures apply at least analogously. In addition to the corresponding sections shown in the figures, the floating caliper brake 5 has another substantially identical section that is arranged offset along a plane, along which a mounted brake disc extends.

The floating caliper brake 5 shown in the figures therefore comprises two adjustment devices 3, two guide elements 61, and two bore sections 67, each of which is substantially identical, and at least the two guide elements 61 and the two bore sections 67 each extend parallel to one another and to the axial direction 17. Forces can therefore be transmitted to two sections of the brake carrier 57 spaced apart from one another perpendicular to the axial direction 17 in each case between the guide elements 61 and the sections of the brake carrier 57, and at the same time, a relative movement along the axial direction 17 can be guaranteed between the guide elements 61 and the sections of the brake carrier 57. Forces caused by the weight of the brake caliper 59, the weight of an adjustment device, vibrations, deformation forces, or even due to a braking operation, can be transmitted via the respective fastening regions 63 of the corresponding guide elements 61 to two sections of the brake caliper spaced apart from one another, from the brake caliper 59 to the corresponding guide element 61, and from there, through contact of the corresponding section of the guide element 61 with a corresponding inner surface of a bore section 67, to the brake carrier 57, for example, perpendicular to the axial direction 17, and from there to the vehicle component.

In an alternative exemplary arrangement, the floating caliper brake 5 has only one adjustment device 3, two guide elements 61, and two bore sections 67. Viewed perpendicularly to the axial direction 17, the floating caliper brake 5 therefore comprises an adjustment device 3 on one side of the rotational axis of the brake disc, and no adjustment device 3 on a second side of the rotational axis of the brake disc opposite a first side.

In connection with the present disclosure, the term "axial direction" is used in different contexts. For example, it is provided that the brake caliper 59 can be guided relative to the brake carrier 57 along the axial direction 17. The use of "along" in connection with the axial direction 17 does not, for example, include any restrictive directional indication, meaning that the brake caliper 59 can be guided relative to the brake carrier 57 both in the axial direction 17 and against the axial direction 17, for example. The use of "in" or "against" in connection with the axial direction 17 includes, a directional indication, meaning that a surface facing in the axial direction 17 is oriented in such a manner that the surface faces in the direction of the axial direction 17, for example, i.e. in the direction indicated by the arrow 17, and a surface that faces against the axial direction 17 is oriented, for example, in such a manner that the surface faces in the direction against the axial direction 17, i.e. in the direction opposite the direction indicated by the arrow 17.

Furthermore, it should be noted that "comprising" does not exclude other elements or steps, and "a" or "an" does not exclude a plurality. It should also be noted that features described with reference to one of the above exemplary arrangements can also be used in combination with other features of other exemplary embodiments described above. Reference signs in the claims are not to be construed as limiting.

The invention claimed is:

1. A floating caliper brake comprising:

a brake carrier, which has a brake carrier fastening arrangement for fastening the brake carrier to a component of a vehicle, a brake caliper, which has a brake caliper fastening arrangement for fastening an adjustment device to the brake caliper, a guide mechanism, which is designed to guide the brake caliper relative to the brake carrier along in an axial direction, and which comprises a guide element that extends from a fastening region, by which the guide element is fastened to a section of the brake caliper, towards a free end, and a bore section extending along the axial direction in a section of the brake carrier, wherein a section of the guide element is arranged in the bore section, and an adjustment device, which comprises an adjustment element, a first transmission section, which has a first fastening region by which the first transmission section is connected to a brake carrier section, and which has a second fastening region, by which the first transmission section is connected to a first end section of the adjustment element, a second transmission section, which has a third fastening region by which the second transmission section is connected to the free end of the guide element, and a gear section, wherein the gear section is connected to the second transmission section via an internal thread and an external thread, so that rotating the gear section about a central axis extending along the axial direction relative to the second transmission section results in an adjustment of the second transmission section relative to the gear section along the axial direction, wherein the gear section is connected to a connecting section that is connected to a second end section of the adjustment element, wherein the first transmission section and the second transmission section can be arranged relative to one another along the axial direction, so that the adjustment element is in a first position, in which the first end section and the second end section are spaced apart from one another along the axial direction at a first distance, and the first transmission section and the second transmission section can be arranged relative to one another along the axial direction, so that the adjustment element is in a second position, in which the first end section and the second end section are spaced apart from one another along the axial direction at a second distance which is smaller than the first distance, and wherein when the second distance between the first end section and the second end section is equal to, or greater than, a predefined distance, an actuation section of the adjustment element engages with the gear section such that an increase in the second distance of the actuation section of the adjustment element causes the gear section to rotate about the central axis relative to the second transmission section, in such a manner that the second transmission section moves away from the gear section along the axial direction.

2. The floating caliper brake as claimed in claim 1, wherein the adjustment element is arranged in an inner space and sections of the floating caliper brake that define the inner space are arranged between the adjustment element and surroundings of the floating caliper brake.

3. The floating caliper brake as claimed in claim 1, wherein the adjustment element comprises a first arcuate section extending from the first end section along the axial direction towards the second end section, and wherein an arm section extends from a first section connected to the first arcuate section to a second section comprising the actuation section.

4. The floating caliper brake as claimed in claim 3, wherein the first arcuate section is shaped in such a manner that between a first section of the first arcuate section, which is connected to the first end section, and a second section of the first arcuate section, which is connected to the second end section, a third section of the first arcuate section, viewed in a plane along which a central axis extending along the axial direction runs, is arranged on a side facing away from the central axis of a connecting line arranged in the plane between the first section of the first arcuate section and the second section of the first arcuate section.

5. The floating caliper brake as claimed in claim 4, wherein the first arcuate section is elastically deformable, so that in the first position, the first arcuate section is elastically undeformed, and in the second position, the first arcuate section is elastically deformed, so that the actuation section in the second position is arranged offset, seen in the plane, compared with the first position in the direction of the side of the connecting line facing away from the central axis between the first section and the second section.

6. The floating caliper brake as claimed in claim 5, wherein the first arcuate section is elastically deformable, such that multiple second positions are provided, and the displacement of the actuation section in a direction of a side of a connecting line facing away from a central axis increases as the second distance decreases.

7. The floating caliper brake as claimed in claim 6, wherein the third section of the first arcuate section has a curved shape, such that the third section has a concave surface that faces the central axis and a convex surface that faces away from the central axis.

8. The floating caliper brake as claimed in one of claim 3, wherein the first arcuate section is elastically deformable, so that in the first position, the first arcuate section is elastically undeformed, and in the second position, the first arcuate section is elastically deformed, so that the actuation section in the second position is arranged offset, seen in the plane, compared with the first position in the direction of the side of the connecting line facing away from the central axis between the first section and the second section.

9. The floating caliper brake as claimed in claim 3, wherein the first arcuate section is elastically deformable, such that multiple second positions are provided, and the displacement of the actuation section in a direction of a side of a connecting line facing away from a central axis increases as the second distance decreases.

10. The floating caliper brake as claimed in claim 3, wherein the third section of the first arcuate section has a curved shape, such that the third section has a concave surface that faces the central axis and a convex surface that faces away from the central axis.

11. The floating caliper brake as claimed in claim 1, wherein the adjustment element further comprises a second arcuate section that extends from the first end section along the axial direction towards the second end section and is elastically deformable.

12. The floating caliper brake as claimed in claim 1, wherein the first end section extends circumferentially about the central axis.

13. The floating caliper brake as claimed in claim 1, wherein the second end section extends circumferentially about the central axis.

14. The floating caliper brake as claimed in claim 1, wherein the first end section has a first contact surface facing in the circumferential direction about the central axis and/or a second contact surface facing in the circumferential direction about the central axis and/or a third contact surface facing in the circumferential direction about the central axis and/or a fourth contact surface facing in the circumferential direction about the central axis.

15. The floating caliper brake as claimed in claim 1, wherein the first fastening region of the first transmission section has an external thread, and the brake carrier section to which the first transmission section is connected has an internal thread.

16. The floating caliper brake as claimed in claim 1, wherein the internal thread is provided on the gear section, and the external thread is provided on the second transmission section, and the gear section and the second transmission section are connected to one another via the internal thread and the external thread.

17. The floating caliper brake as claimed in claim 1, wherein the external thread is provided on the gear section, and the internal thread is provided on the second transmission section, and the gear section and the second transmission section are connected to one another via the internal thread and the external thread.

18. The floating caliper brake as claimed in claim 1, wherein one or multiple disc springs is/are provided between the first transmission section and the second transmission section, when viewed along the axial direction.

19. The floating caliper brake as claimed in claim 1, wherein between a surface of the second transmission section facing in the axial direction and a surface of the brake carrier section, in which the bore section is provided, facing away from the axial direction, a third distance is provided which is greater than a maximum thickness that defines a wearable section of one of the brake pads or of the brake pads.

20. The floating caliper brake as claimed in claim 1, further comprising a return spring that is attached to the brake caliper and rests against the brake carrier in such a manner that the return spring provides a force acting on the brake carrier in the axial direction and on the brake caliper against the axial direction.

* * * * *